United States Patent [19]
Zanoni

[11] 3,853,406
[45] Dec. 10, 1974

[54] DIFFERENTIAL OPTICAL NONCONTACTING DIAMETER GAUGE UTILIZING A PAIR OF LINEARLY SCANNING LIGHT BEAMS SEQUENTIALLY SCANNING THE TEST PIECE

[75] Inventor: Carl A. Zanoni, Middletown, Conn.

[73] Assignee: Zygo Corporation, Middlefield, Conn.

[22] Filed: Dec. 3, 1973

[21] Appl. No.: 421,247

Related U.S. Application Data

[63] Continuation-in-part of Ser. Nos. 368,441, June 8, 1973, abandoned, and Ser. No. 388,267, Aug. 14, 1973, , and Ser. No. 394,562, Sept. 6, 1973.

[52] U.S. Cl.................. 356/167, 356/160, 250/560
[51] Int. Cl. .......................................... G01b 11/02
[58] Field of Search.................... 356/159, 160, 167; 250/560

[56] References Cited
UNITED STATES PATENTS
3,665,202  5/1972  McLeman........................... 250/560
3,710,128  1/1973  Kubisiak............................. 250/560

Primary Examiner—Robert J. Corcoran
Attorney, Agent, or Firm—Milton Zucker

[57] ABSTRACT

An electrooptical sensor is described for providing an output proportional to the difference between the cross section of an object, e.g. the diameter of a cylinder, and a known preset value. Two parallel beams of laser light separated by a known preset distance are scanned across the test object. By photoelectrically sensing when each laser beam is modulated on or off by the edges of the object, an electrical pulse whose width is equal to the difference between the object diameter and the spacing of the two laser beams is obtained. The two parallel, offset scanning laser beams are produced by reflecting two laser beams separated by a preset angle from a uniformly rotating mirror, or a multifaceted prism, placed at the focus of a lens; the beams are polarized at different orientations, preferably orthogonal to each other, so that they can be readily separated in the receiver portion of the device. The passage of the beams past the edges of the object is determined by the first and second derivatives of the output of each photodetector to accurately determine the point where the center of each laser beam coincides with an edge of the object.

8 Claims, 11 Drawing Figures

DIFFERENTIAL OPTICAL NONCONTACTING DIAMETER GAUGE UTILIZING A PAIR OF LINEARLY SCANNING LIGHT BEAMS SEQUENTIALLY SCANNING THE TEST PIECE

RELATED APPLICATIONS

This application is a continuation-in-part of my prior applications Ser. No. 368,441 filed June 8, 1973 (now abandoned), Ser. No. 388,267 filed Aug. 14, 1973, and Ser. No. 394,562 filed Sept. 6, 1973.

BACKGROUND OF THE INVENTION

1. Field of the Invention

The present invention relates to apparatus for the accurate measurement of the cross section of an opaque object, such as the diameter of a cylinder, although it is useful for a great variety of object geometries. Specifically, the apparatus measures the difference between the diameter of an object and a known, preset value. More particularly, the invention relates to noncontacting electrooptical apparatus for this type of measurement which is capable of rapidly and accurately measuring such diameters when the object is moving.

2. The Prior Art

For the accurate measurement of the diameter of soft, delicate, hot, or moving objects, noncontacting sensors must be used. Prior-art devices of this character include capacitive gauges, eddy-current gauges, air gauges, and optical sensors. The nonoptical sensors cannot work at distances of more than a small fraction of an inch without loss of sensitivity.

Optical sensors have advantages due to the nature of light itself. The principal advantages are:

1. They do not require direct mechanical contact between the sensor and the object to be measured;
2. The distance from the sensor to the object to be measured can be large;
3. The response time is limited only to that of the photodetector and its electronics; and
4. Light variations are directly convertible to electrical signals.

Prior-art optical sensors employ various techniques, such as shadow projection, diffraction phenomena and scanning light beams.

Devices using a single scanning light beam move the beam past the object and record the point at which the beam no longer is obstructed. The problem is to determine the exact point at which the light is cut off and again appears. A typical laser beam is 1 mm. wide (0.04 inch), and it is necessary to pinpoint when the center of this beam passes by the edges of the object.

One approach has been the use of a constant scan speed for the beam of light; this requires complete rotary motion through 360°, using an expensive constant-speed device. The angular speed must be extremely uniform, especially for large measurement apertures. Since the device measures only during the time when the light passes the object (once every rotation), only a small fraction of the actual time available is used in measuring. Thus, to get a measurement every 1/10 second, a speed of 600 revolutions per minute is required. Moreover, to get the necessary geometrical relationship between the angularly-scanned light beam and the linearly-scanned sample beam, it is necessary to use an $h = f\theta$ corrected lens. The accuracy of such devices leaves something to be desired; one such product on the market claims an accuracy of 0.1 percent or 0.0005 inch (0.5 mil), whichever is larger, which is not good enough for many uses.

A second approach eliminates the need for uniform angular-scan rates by measuring the angular-scan motion with some sort of incremental angular encoder such as a pulse generator. This also requires the use of an $h = f\theta$ corrected lens to generate the constant linear-scan speed. In addition, resolution is poorer than in the constant-speed device. One device of this type is reported in the literature as having an accuracy of 0.0015 inch at 30 scans per second.

While these prior-art optical noncontacting gauges are useful for many measurements, they cannot be used for accurate control of many industrial operations. For example, in the highspeed extrusion of aluminum rod, it is desirable to get readings every 5 to 10 milliseconds or faster, with accuracies within 0.0005 inch (0.5 mil) or less, even for rods over 0.5 inch in diameter. The extruded rod moves in every direction as it comes out of the die, so that the gauge must be capable of these fast, accurate measurements on a test object which is vibrating and not at rest.

In my prior applications Ser. No. 368,441 filed June 8, 1973 (now abandoned), Ser. No. 388,267 filed Aug. 23, 1973, and Ser. No. 394,562 filed Sept. 6, 1973, I have described and claimed electrooptical noncontacting measuring devices which overcome many of the undesirable features of these prior-art devices, and which are capable of fast, accurate measurements of moving objects. In these devices, a beam of light is scanned either by a rotating mirror or an oscillating mirror, the scanned beam is collected and split, one portion of the split beam is passed through a precision scale with alternate transparent and opaque bands onto a first photodetector to produce a sinusoidal signal with a spatial frequency corresponding to the spacings on the scale, and the other part of the split beam is directed past the test object onto a second photodetector which detects the modulation of the beam by the object; the signals are appropriately combined to measure the test object. A vernier is provided to measure the partial sine waves from the first photodetector. An accurate measurement of the precise points at which the light beam passes the edges of the test object is obtained by defining the edges as the point at which the first derivative of the energy from the second photodetector is above a fixed value, and the second derivative passes through zero.

These devices have marked advantages over prior-art devices, particularly in accuracy and in speed and frequency of measurements. With an oscillating mirror, measurements can be made in a few milliseconds, and can be repeated every 5 milliseconds; measurement precision of a few tenths of a mil (0.0001 to 0.0003 inch) is obtainable. As a result, they are highly useful in many applications.

However, these devices do not have sufficiently short measurement durations for some applications, and for some geometrical configurations. For example, in measuring a rapidly moving band of metal with notches in it, where it is desired to accurately control the depth of the notches, my earlier devices are not fast enough to do the job as accurately as is wanted because of oscillation of the test object. The devices are also susceptible to false readings due to static dust on the system optics. This is minimized by their design, but under bad dusting conditions, present in some operations, difficulties can occur.

OBJECTS OF THE INVENTION

This invention aims to improve the speed and accuracy of my own previous devices, and to markedly reduce the instrument'a sensitivity to dust. My new device may be used both in transmission past an opaque object, or in reflection from a flat, reflective object.

Other objects of the invention will be apparent from the following description taken in connection with the accompanying drawings, and its scope will be pointed out in the appended clause.

STATEMENT OF THE INVENTION

In accordance with the instant invention, I provide (1) a source of radiant energy, most preferably light from a laser, to produce a narrow beam of light; (2) means for splitting said beam into two parallel beams of nearly equal intensity, and of such different polarization that the beams can be readily separated, preferably of orthogonal polarization; (3) means for adjusting the distance between the two parallel beams; (4) means for focusing said two beams onto a uniformly rotating reflective surface which reflects the beams onto (5) means for collimating said reflected beams to provide a pair of linearly-scanned light beams which can be interrupted by the object being measured; (6) means for collecting, separating, and photosensing the two linearly-scanned beams to produce two pulses corresponding to the interruption and noninterruption of the beams by the object; and (7) means for processing the said pulses to produce a pulse whose width is proportional to the difference between the cross-sectional width of the object being measured and the distance between the two parallel-scanned beams.

As in the devices of my prior applications Ser. Nos. 368,441, 388,267 and 394,562, an accurate measurement of the precise points at which the light beam passes the edges of the test object is obtained by defining the edges as the points at which the first derivative of the output of the photodetector preamplifier is above a fixed value, and the second derivative of the output of the photodetector preamplifier passes through zero.

THE DRAWINGS

DETAILED DESCRIPTION OF THE INVENTION

Figure 1:
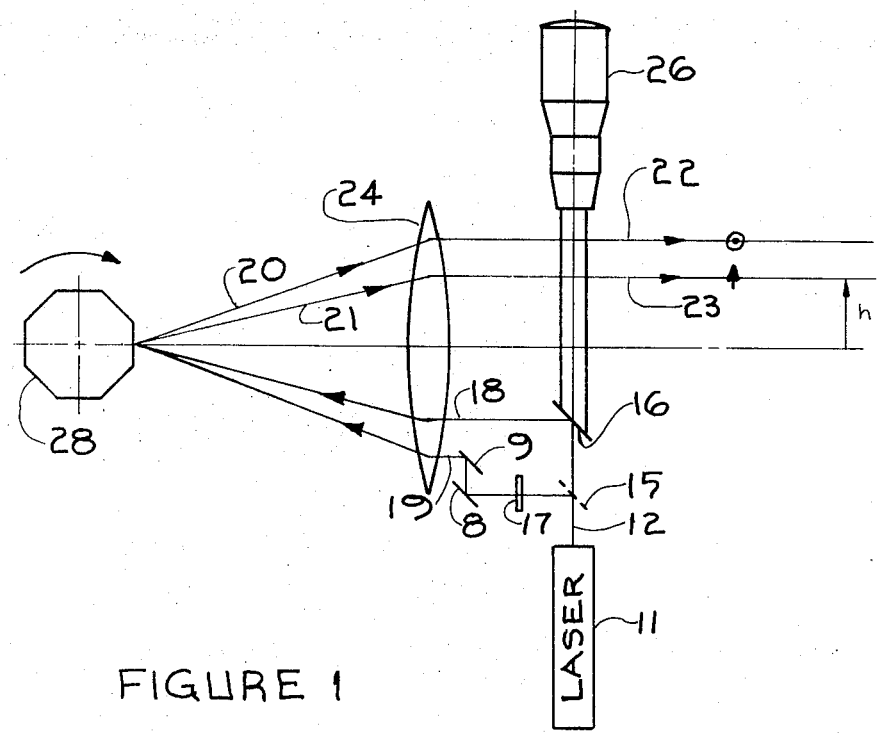
FIG. 1 is a schematic diagram showing a view of the transmitter optical system used to produce the two scanning beams (41 in FIGS. 5, 6 and 7).
Figure 2:
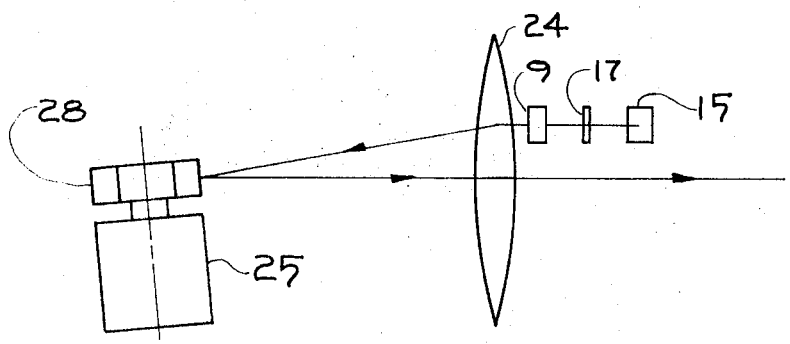
FIG. 2 is a schematic view orthogonal to FIG. 1 of the transmitter optical system used to produce the two scanning beams.

Description and Explanation of FIGS. 1 and 2

While the apparatus has application for a wide range of radiation sources, the following description is taken by way of example with respect to an optical measuring system. The term "radiant energy" as used herein includes, but is not limited to, electromagnetic energy of all frequency ranges.

FIG. 1 is a schematic view of the transmitter optical system used to produce the two scanning beams.

FIG. 2 is a schematic view orthogonal to FIG. 1.

A light source such as a tungsten bulb, xenon bulb, light-emitting diode, laser diode, or other source of radiant energy, and most preferably a gas laser (11), provides optical energy for the narrow, nearly collimated, linearly-polarized beam (12) in FIG. 1. Partially transmitting mirror (15) produces two beams from a single beam (12) such that the reflected beam (19) is parallel to the optical axis of lens (24). This beam shall hereinafter be referred to as the first beam (19). The first beam (19) passes through the half-wave phase retardation plate (17) which has its optical axis so oriented as to rotate the plane of polarization of the first beam (19) so that it is perpendicular to the plane of polarization of the hereinafter described second beam (18). For reasons of convenience of space, the first beam (19) is twice reflected by 45° mirrors (8) and (9) to get the beam into line with the transmitter lens (24). The transmitter lens (24) then images this first beam (19) onto one of the reflecting surfaces of the uniformly rotating scanner prisms (28).

The beam transmitted by the partially transmitting mirror (15) is reflected by mirror (16) to produce a second beam (18) which is also parallel to the optical axis of lens (24). The transmitter lens (24) then images the second beam (18) onto one of the reflecting surfaces of the uniformly rotating scanner prism (28). The scanner prism is rotated at a uniform angular rate by the motor (25). Because of the differential nature of the measurement in this invention, the specification on the uniformity of rotation is quite loose, so that an inexpensive synchronous motor is adequate for most applications. The rotating scanner prism (28) converts the two beams (18) and (19) into two angularly-scanned beams (20) and (21). Transmitter lens (24) then recollimates the beams (20) and (21) to produce two parallel, linearly-scanned beams (22) and (23). The distance between the two linearly-scanned beams (22) and (23) is determined by the distance between the beams (18) and (19), which is set by the offset of mirrors (9) and (16). The offset between mirrors (9) and (16) is variable and can be set with a micrometer (26), for example. The beams (22) and (23) scan the measurement region. The linear size of the scan is essentially limited by the aperture diameter of lens (24). It will be noted that beam (23) is polarized in the plane of the paper ( ↑ ), while beam (22) is polarized orthogonal to the paper ( ⊙ ).

Figure 3:
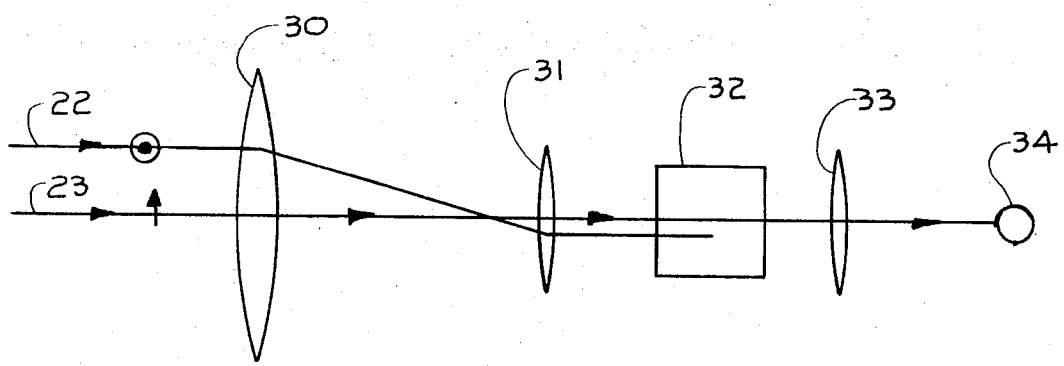
FIG. 3 is a schematic diagram showing a view of the receiver optical system used to collect, separate, and photodetect the two scanned beams (42 in FIGS. 5, 6 and 7).
Figure 4:
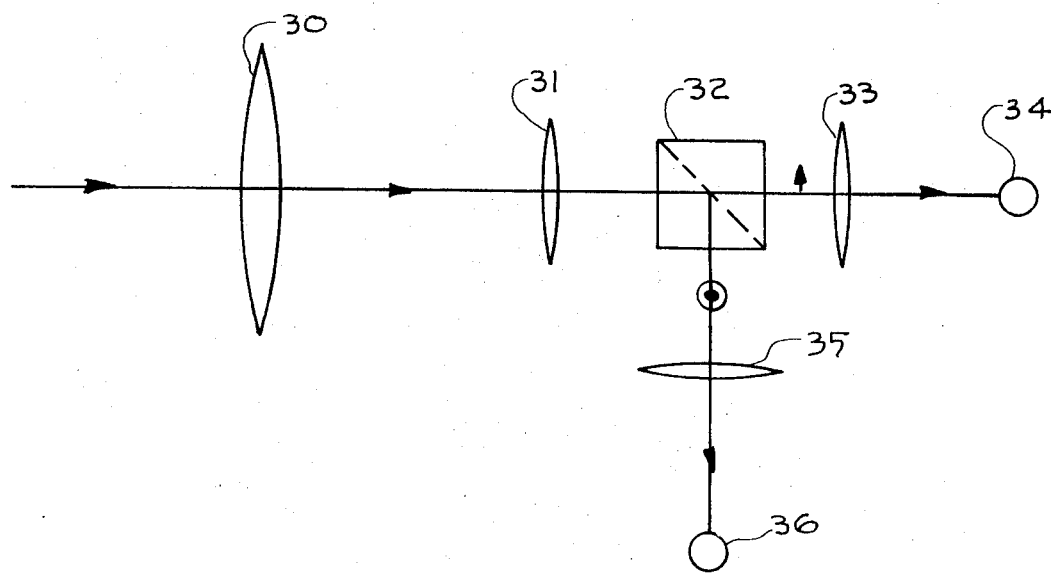
FIG. 4 is a view orthogonal to FIG. 3 of the receiver optical system used to collect, separate, and photodetect the two scanned beams.

If desired, the partially transmitting mirror (15), the half-wave phase retardation plate (17), and the mirrors (8) and (9) can all be replaced by a polarization beam splitter, similar to the beam splitter (32) in FIGS. 3 and 4.

The relation governing the ray height for an ordinary collimating lens is $h = f \sin \theta$, where $\theta$ is the angle between the ray and the optical axis at the focal point of the lens, $f$ is the focal length of the lens, and $h$ is the ray height of the collimated ray. Thus, if an ordinary collimating lens is used for transmitter lens (24), the offset between beams (22) and (23) will be a function of scan angle even though the offset of the two input beams is fixed. Clearly, this is undesirable. Therefore, it is necessary to use a specially corrected lens which follows an $h = f\theta$ relation. Since for small angles, $\sin \theta \approx \theta$, the correction is higher-order and not difficult to achieve.

A multifaceted prism (28) is used to achieve a high measurement rate. For a motor rotating at 600–1,200 revolutions per minute, measurement rates of 200–500 per second are achievable with only 20–30 facets. For a larger-diameter scanner prism, even more facets are possible, so that the measurement rates given above are not absolute limits and can be substantially increased relatively easily. The specifications on the scanner prism are not stringent, so that it is quite inexpensive. The fact that the scanning reflecting surface does not coincide with the axis of rotation of the scanners is not a problem because of the relatively small mechanical rotation angle over which the light is collected by lens (24). For reasons to be detailed later, the pyramidal angle of each facet is preferably offset from 90° by a small amount of the order of 1 to 3 tenths of a degree, with individual adjoining facets having different pyramidal angels.

Description and Explanation of FIGS. 3 and 4

Figure 5:
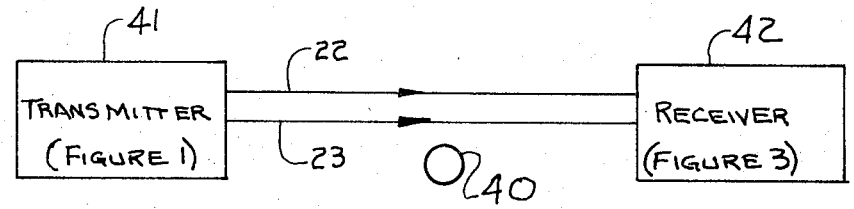
FIGS. 5 and 6 are schematic views orthogonal to each other which illustrate how the apparatus is used in the transmission mode.
Figure 6:
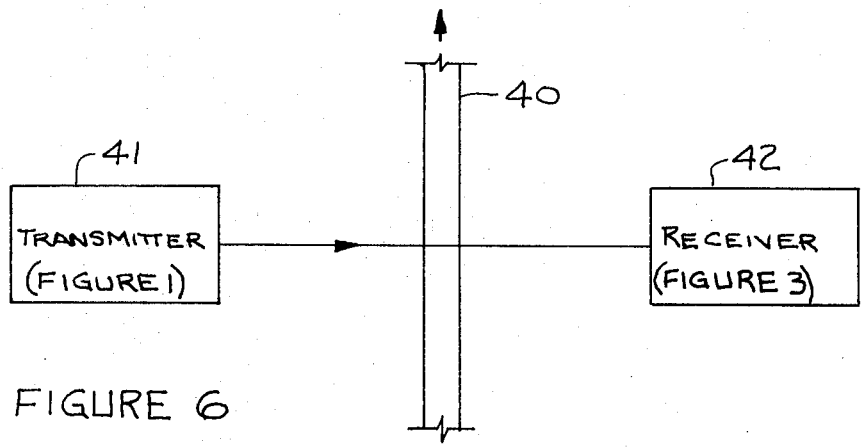
Figure 7:
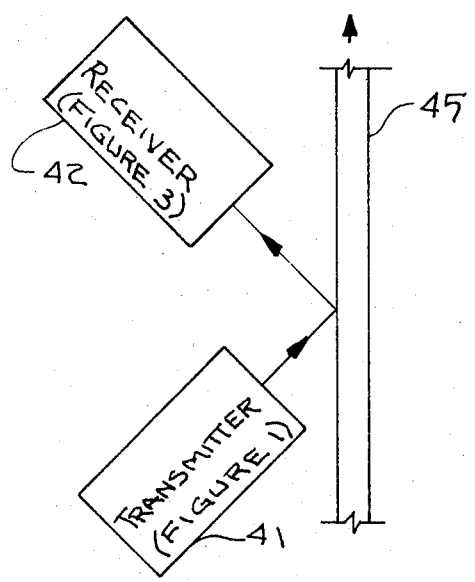
FIG. 7 illustrates how the apparatus is used in the reflective mode.

FIG. 3 is a schematic diagram showing a view of the receiver optical system used to collect, separate, and photodetect the two scanned beams (42 in FIGS. 5, 6 and 7).

FIG. 4 is a schematic view orthogonal to FIG. 3.

Receiving lens (30) brings the two collimated, parallel beams (22) and (23) to a focus. The front focal point of lens (31) coincides with the back focal point of lens (30), and the focal length of lens (31) is chosen to be smaller than that of lens (30) so that the lenses comprise a beam compressor. The two beams emerge from lens (31) as two parallel, offset beams such that their offset and scan amplitude are reduced by the ratio of the focal lengths of lens (31) and lens (30). Beam splitter (32) is a polarization beam splitter which totally reflects the light of "S" polarization, i.e., polarization perpendicular to the plane determined by the incident ray and the normal to the reflecting surface. Furthermore, beam splitter (32) totally transmits light of "P" polarization, i.e., polarization in the plane determined by the incident ray and the normal to the reflecting surface. In the description of FIG. 1, it was established that beams (22) and (23) are each linearly polarized but with their directions of polarization at 90° to each other. Thus, if the orientation of the polarization of one of the beams is adjusted so that it is either "P" or "S," then the other beam will be "S" or "P" respectively.

Therefore, by suitably arranging the state of polarization of each of the scanning beams (22) and (23), a polarization beam splitter (32) can be used to completely separate the two beams to enable each to be individually photosensed. The lens combination (30) and (31) simply provides compression of the beam scan to enable a relatively small beam splitter to be used. This compression is not essential to the device, but it makes possible the separation of the beams (22) and (23) with an economic, small-size polarization beam splitter, to produce a very simple device. It is possible in some situations simply to place the polarization beam splitter in the converging beams near the focus of lens (30), thus obviating the need for lens (31). Once the two scanned beams are separated by beam splitter (32), focusing lenses (33) and (35) bring the beams to focus on their respective photodetectors (34) and (36).

Description and Explanation of FIGS. 5, 6 and 7

FIGS. 5, 6 and 7 illustrate how the transmitter and receiver optical systems are combined in order to perform measurements.

FIGS. 5 and 6 show two orthogonal views of how the transmitter and receiver optical systems are combined to carry out measurements on an opaque object. This mode can be called the transmission mode. The distance between the two scanned beams (22) and (23) is made equal to the nominal diameter of the object (40) being measured. FIG. 7 shows how the device can be used in a reflective mode when the test object (45) is flat and fairly specular.

Figure 8:
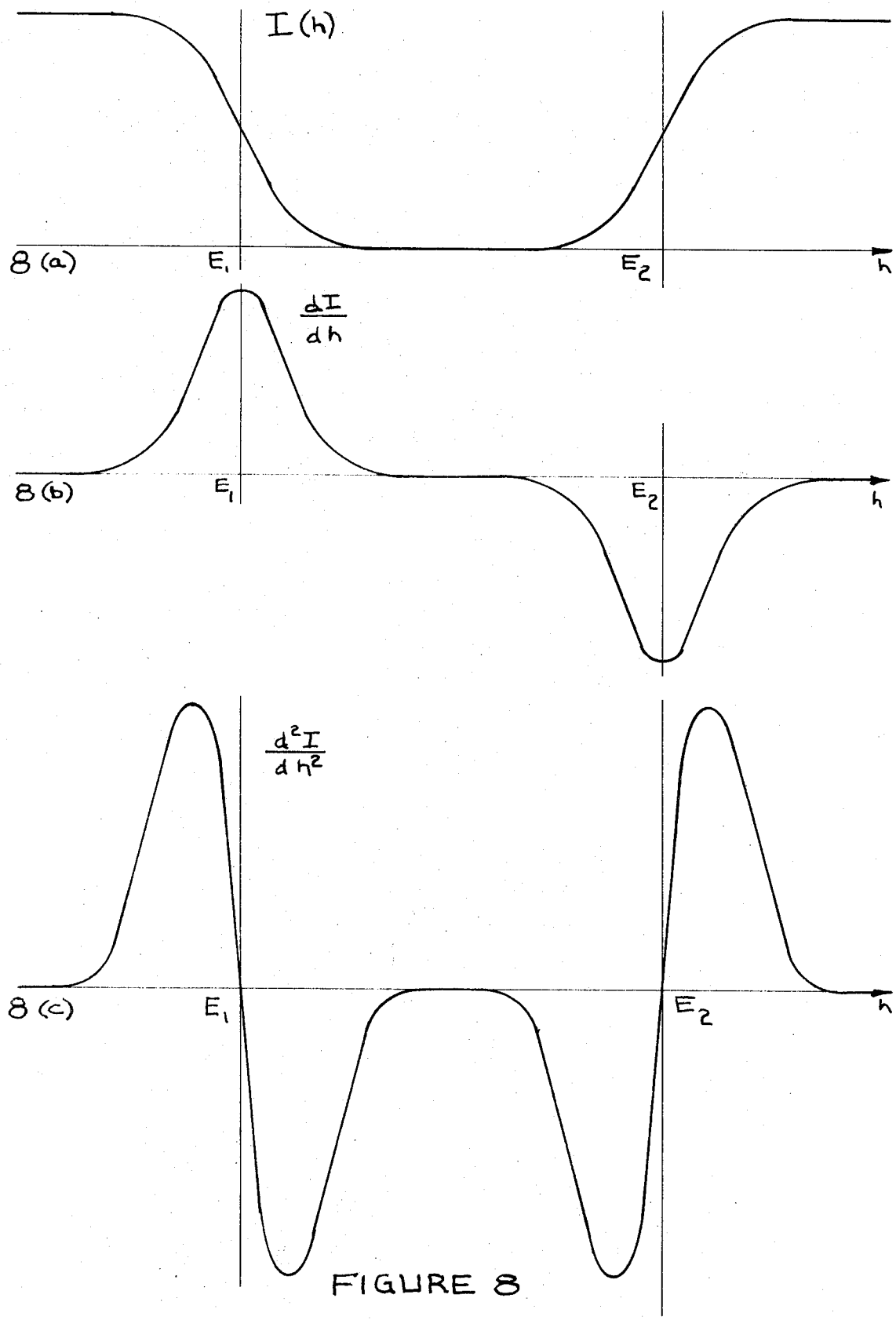
FIG. 8 is a set of curves showing: a. the output of a photodetector preamplifier as one of the beams passes first behind and then out from behind the test object; b. the first derivative of 8($a$); c. the second derivative of 8($a$).
Figure 9:
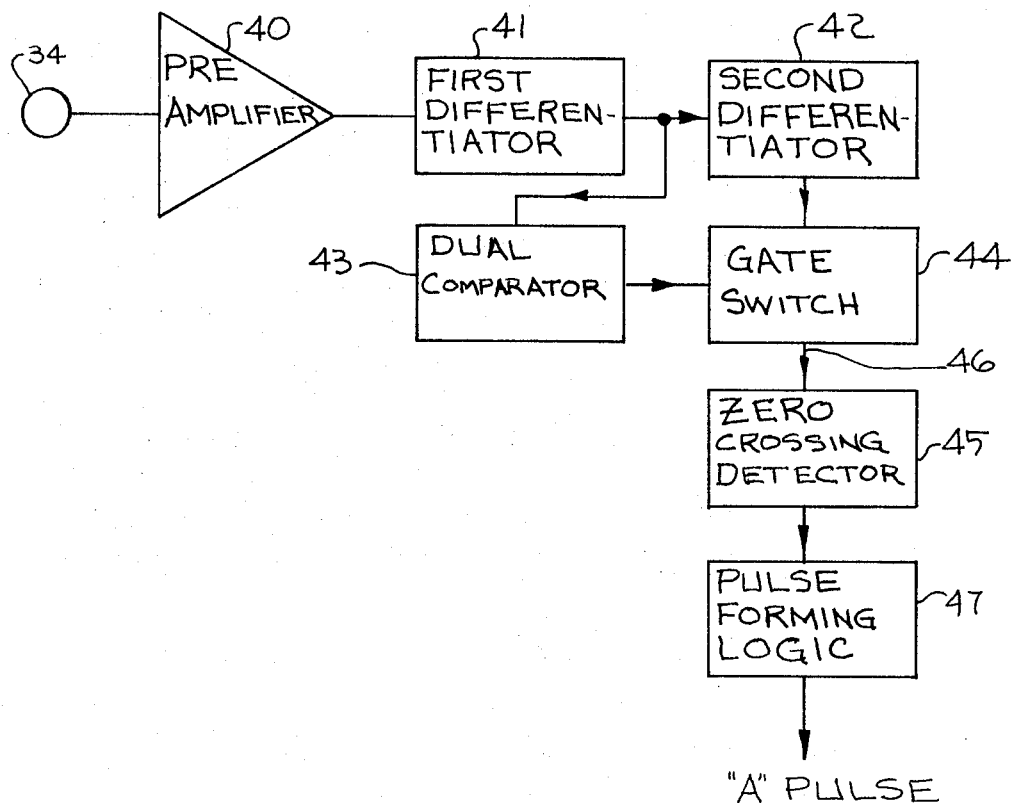
FIG. 9 is a schematic block diagram of the circuitry to define the points where the center of a scanned laser beam coincides with an edge of the object.

Description and Explanation of FIGS. 8 and 9

FIGS. 8 and 9 disclose the means employed to precisely locate the edges of the test object (40) by means of the output of one of the photodetectors, either (34) or (36).

Referring to FIG. 8, 8(a) shows the output of one of the photodetectors (34) or (36) as one of the scanned light beams, (22) or (23), passes across the test object (40), measuring the intensity I of the light beam against the distance $h$. Since the beams (22) and (23) are about 1 mm. in diameter, a beam will pass from maximum intensity to zero intensity over a distance which corresponds to the beam diameter; the edges of the object are at exactly the inflection points E1 and E2 of curve 8(a). As the photodetector measures light intensity, it is necessary to determine the points E1 and E2 on the curve 8(a) with maximum certainty, if good resolution is to be obtained.

I determine these points, E1 and E2, most precisely by means of the techniques illustrated in FIGS. 8 and 9. If the output of the photodetector, curve 8(a), is differentiated, we get curve 8(b). This differentiation can be done with conventional electronic circuitry. The output signal in curve 8(b) is at a maximum at the points E1 and E2 on curve 8(a), since the rates of change are greatest at these points. A further differentiation, to produce the second derivative of the output of the photodetector, gives the curve shown in FIG. 8(c). Here, the curve passes through zero at the points corresponding to E1 and E2. It should be noted that the first derivative is negative during the period during which the light beam emerges from behind the test object, but its absolute value is still at a maximum at the point E2.

By using the outputs of the first and second electronic differentiators, I am able to precisely pinpoint the edges of the test object (40), as shown in FIG. 9. Since the circuitry for each photodetector is identical, FIG. 9 illustrates the circuitry associated with only one of the photodetectors.

The output signal from photodetector (34), curve 8(a), is amplified in preamplifier (40) and passed into a first differentiator (41) to produce a first derivative signal 8(b). This first derivative signal is then supplied to two other circuits: (1) to a second differentiator (42) to produce a second derivative signal 8(c), and (2) to a dual comparator (43) which provides an output signal whenever the absolute value of the first derivative is above a certain value.

The switch (44) is designed so that the second derivative signal 8(c) from second differentiator (42) passes through only when the dual comparator (43) provides an output signal indicating that the absolute value of the first derivative signal 8(b) is above a certain value and in the area of its maximum. A threshold for the 8(b) signal is set in the dual comparator (43) whereby the gate switch (44) passes the signal 8(c) only during the restricted time at which the absolute value of the signal 8(b) is above this threshold. The resultant signal (46) passes into a zero-crossing detector (45). The output of the zero-crossing detector passes into pulse-forming circuitry (47) to produce a pulse, hereinafter denoted as the A pulse.

Photodetector (34) senses one of the two scanned beams, i.e., either (22) or (23). Photodetector (36) senses the other scanned beam. Thus, using circuitry identical with that shown in FIG. 9, photodetector (36) also produces a pulse, hereinafter denoted as the B pulse.

Figure 10:
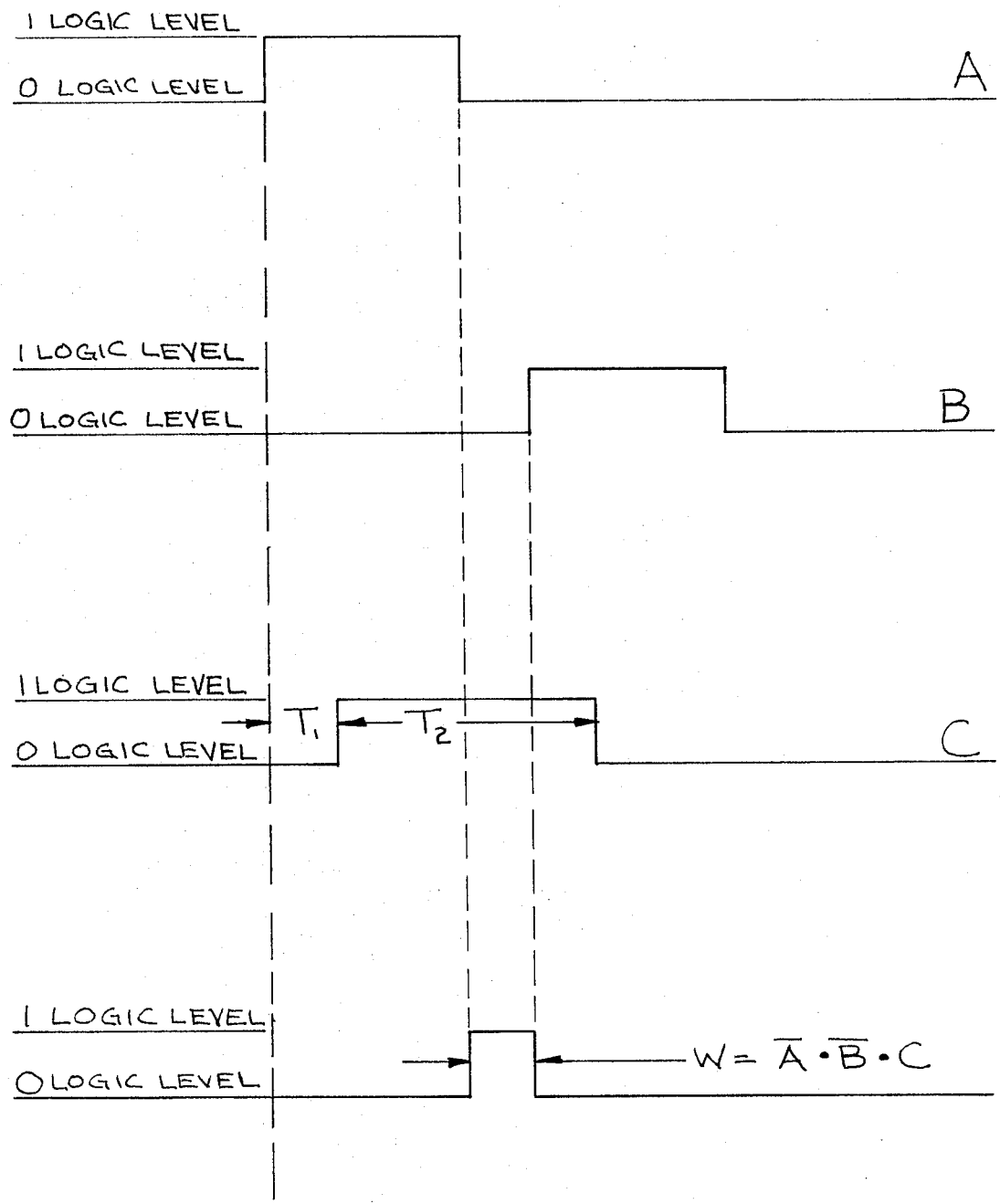
FIG. 10 shows a timing diagram for the signal pulses.
Figure 11:
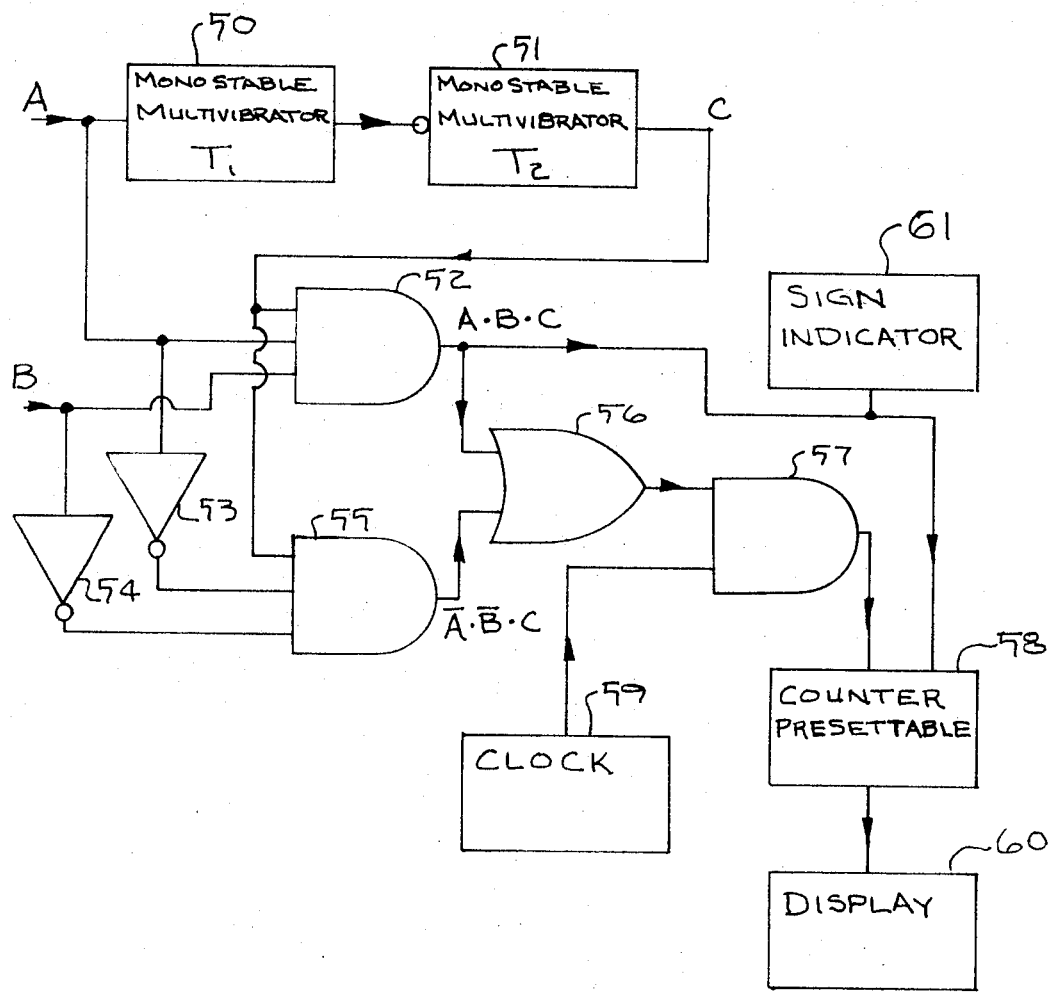
FIG. 11 is a block diagram of the processing of the signal pulses.

Description and Explanation of FIGS. 10 and 11

FIG. 10 shows a timing diagram for the signal pulses; FIG. 11 is a block diagram of the circuitry involved. The case illustrated is for an object whose diameter is less than the offset between the two scan beams; however, the signal processing is not limited to this case and can handle the cases where the object diameter is greater than or equal to the offset between the two scan beams.

In FIG. 10, the two primary signal pulses A and B are shown. The C pulse is derived from the leading edge of the A pulse, using two monostable multivibrators (50) and (51) (FIG. 11). The C pulse is delayed by a time $T_1$ from the leading edge of the A pulse by the first monostable multivibrator (50), and the width of the C pulse is $T_2$, determined by the second monostable multivibrator (51).

The C pulse bridges the gap or overlap between the trailing edge of the A pulse and the leading edge of the B pulse (which gap or overlap measures the difference between the diameter of the object and the offset of the two beams); the C pulse stops before the trailing edge of the B pulse, so that it discriminates against that edge as well as the leading edge of the A pulse.

Using basic-logic language, where "on" is denoted by 1 and "off" by 0, A, B and C represent the pulses, and $\bar{A}$ and $\bar{B}$ are complementary to A and B, both $A \cdot B \cdot C$ and $\bar{A} \cdot \bar{B} \cdot C$ will be zero throughout the cycle where the trailing edge of A coincides with the leading edge of B, since both the A and B combination and the $\bar{A}$ and $\bar{B}$ combination will never both be non-zero at the same time. If the curves overlap, A, B and C will all be 1 ("on") for the period of overlap, while $\bar{A} \cdot \bar{B} \cdot C$ will be zero throughout. In the case illustrated, $A \cdot B \cdot C$ will be zero throughout the cycle, but $\bar{A} \cdot \bar{B} \cdot C$ will be non-zero during the gap, which is represented by W in FIG. 10. Thus, the difference from the preset value as to both sign and magnitude can readily be measured by simple electronic circuitry, as shown in FIG. 11.

Referring to FIG. 11, the C pulse is derived from the A pulse by delaying the leading edge of the A pulse by an amount $T_1$ with the monostable multivibrator (50). The width of the C pulse, $T_2$, is determined by the second monostable multivibrator (51). The inverters (53) and (54) provide the $\bar{A}$ and $\bar{B}$ signals respectively. The AND gates (52) and (55) yield the $A \cdot B \cdot C$ and $\bar{A} \cdot \bar{B} \cdot C$ pulses which are applied to the OR gate (56). A non-zero value of $A \cdot B \cdot C$ causes the positive sign to appear on the sign indicator (61) (which is otherwise negative). The output of a high-frequency clock (59) is supplied to the input of the AND gate (57). The other input to AND gate (57) is the output of the OR gate (56). The output of gate (57) is a number of clock pulses proportional to the width of the W pulse. Bidirectional counter (58) counts the number of clock pulses occurring during the W pulse, with the sign pulse fixing the direction of count. The output of the counter is supplied to digital display (60). A suitable selection of clock frequency and scan speed provides the measurement in convenient dimensional units.

If it is desired to display the object diameter rather than the deviation from a preset value, the preset value can be preloaded into the counter (58). Thus, the signed value of deviation will be added to the preset value to yield the object diameter.

In the present invention, rather than attempting to use only one scanning beam to generate a pulse, e.g. A pulse, to measure the diameter of the test object, two scanning beams with an offset equal to the nominal diameter of the test object are used to provide an output proportional to the difference between the object diameter and the preset, known offset between two beams. This differential, two-beam method has a great many advantages over a single-beam diameter gauge. While there are some applications where a single-beam device must be used, e.g., where the test object diameter is changing substantially very frequently or where multiple dimensions which are quite different are to be measured on a test object, there are a great number of applications where the differential, two-beam diameter gauge is the preferred method because of its greater simplicity and improved performance.

The device as illustrated has many advantages over prior-art devices. It is relatively inexpensive and simple due to its differential mode of operation. Because of the differential mode of measurement, the requirements on the device (25) which rotates the scanner prism are relaxed considerably. In addition, the duration for a measurement is reduced by two to three orders of magnitude over a nondifferential scanning method. The extremely short duration for a measurement, e.g., 10 microseconds or less, results from the fact that the measurement time is essentially the time it takes the scanned light beam to traverse the deviation between the object diameter and the preset value. In prior-art devices, the duration of the measurement is the time it takes the scanned light beam to traverse the entire object diameter. For objects moving at a high speed and for objects which may be vibrating at high frequencies, the need for a device with a short duration of measurement is obvious.

More importantly, the present invention provides an apparatus having extremely high resolution and linearity independent of the size of the object being measured, with greater simplicity and less expense than prior-art devices. Measurement precision of a few tenths of a mil, i.e. 0.0001 to 0.0003 inch, is readily obtainable. For individual measurements, with averaging, even higher precision is obtainable.

The present device takes measurements at quite rapid rates. There are several advantages which accrue from a high measurement rate. With a high measurement rate, one can average a large number of readings and still obtain results at a rapid rate. A high measurement rate is necessary when a moving object has fine geometrical detail which must be measured. A continuous band moving at a high rate with various cut-outs and serrations is an example.

In addition, the two scanned beams can be offset not only in the scan plane but also in a direction perpendicular to the scan plane so that geometrical relations between two edges displaced along the test object can be measured.

Because static dust on the optics affects the basic light curve 8(a), measurement errors can be introduced when the edges of the object coincide with or are near dust particles. Since the object is usually moving about in the direction of scan, the static dust errors manifest themselves as occasional deviant measurements. In order to provide some discrimination against such deviant measurements, two important features of the present invention are utilized: firstly, the high rate of measurement, and secondly, the built-in offset in the pyramidal angles of the scanner prism.

The offset pyramidal angles assure that the scan plane of each successive scan is shifted in a direction normal to the scan plane. Therefore, the probability that a dust particle will yield repeated deviant measurements is greatly reduced. Because of the high measurement rate, the individual measurements can be screened to eliminate deviant measurements by using either simple discrimination techniques or correlation techniques. The screened individual measurements can then be combined and averaged to provide an output measurement.

The precise position of the test object in the test space is not important; the object need only be somewhere in the scanning zone of the beams. With other than cylindrical objects, the orientation of the object to the scanning beam is, of course, essential. However, with cylindrical objects, other than gross variations in orientation make very little difference, having only second-order effects on the measurements. Thus, the device can be used for measuring extruded aluminum rod as it comes out of an extruder at high speed, despite wiggling of the extruded rod which both changes the position of the rod and its orientation.

Besides operating in a mode where the test object blocks the scanned light beams, the device can be used in a reflective mode for certain flat, fairly specular objects, e.g., a razor blade band. In this latter example, one edge of interest is not the edge of the object but rather the line, commonly called the heel, between the side of the unground band and the ground facet of the cutting edge. Thus, the present invention is ideally suited for in-process measurement of the heel heights of razor blade bands.

The output signal from the counter, instead of actuating a display, can be used, in conjunction with appropriate servo mechanisms, to make desired operations to control, in-process, the size of the test object.

While a preferred embodiment of the invention has been disclosed, obviously modifications can be made therein without departing from the scope of the invention as defined in the claims.

I claim:

1. An electrooptical device for measuring the cross-sectional width of an opaque test object which comprises (1) a source of radiant energy which produces a narrow beam; (2) means for splitting said beam into two parallel beams of nearly equal intensity and of such different polarization that the two beams can be readily separated; (3) means for adjusting the distance between the two parallel beams; (4) means for focusing said two beams onto a reflecting uniformly rotating surface which reflects the beams onto (5) means for collimating said reflected beams to provide a pair of linearly-scanned light beams which are separated by a uniform preset distance and which can be interrupted by the object; (6) means for collecting, separating, and separately photosensing the two linearly-scanned beams to produce two pulses corresponding to the interruption and noninterruption of the beams by the opaque test object; and (7) means for processing said pulses to produce a pulse whose width is proportional to the difference between the width of the test object and the distance between the two parallel-scanned beams.

2. The device of claim 1, in which the means (2) split the narrow beam into two parallel beams of orthogonal polarization.

3. The device of claim 1, in which the said reflecting uniformly rotating surface is a multifaceted prism.

4. The device of claim 1, in which the said reflecting uniformly rotating surface is a multifaceted prism with the pyramidal angle of each facet offset from 90° by a small amount, and with individual adjoining facets having slightly different pyramidal angles.

5. The device of claim 1, in which the source of radiant energy is a laser beam.

6. The device of claim 1, in which the edges of the test object are determined by means which (a) differentiate the output of each photosensing means to produce signals of maximum intensity at points corresponding to the edges of said test object; (b) further differentiate a portion of each of said differentiated signals to produce signals of zero intensity at points corresponding to the edges of said test object; (c) feed a portion of the first differentiated signal to a switch to which the second differentiated signal is also fed, which switch passes the second differentiated signal only for a limited period adjacent the peaks of said further differentiated signal; and (d) feed the signal from said switch to a zero-crossing detector which feeds the signal to the means which form the pulses corresponding to the said interruption and noninterruption of the beams by the opaque test object.

7. The device of claim 1, in which the means (7) for processing the said pulses, designated A and B, corresponding to the interruption and noninterruption of the beams by the opaque test object, comprise (a) means to generate the pulse C derived from the leading edge of the pulse A so as to bridge any gap or overlap between the trailing edge of pulse A and the leading edge of pulse B; (b) means to generate pulses $\bar{A}$ and $\bar{B}$ complementary to pulses A and B; (c) means to derive $A\cdot B\cdot C$ and $\bar{A}\cdot\bar{B}\cdot C$ from A, B and C; and (d) means to measure the time during which either $A\cdot B\cdot C$ or $\bar{A}\cdot\bar{B}\cdot C$ is non-zero to determine the amplitude and sign of the difference between the distance between the two parallel-scanned beams and the width of the test object.

8. The device of claim 5, in which the collimating means (5) is a lens which follows an $h = f\,\theta$ relation, where $\theta$ is the angle between the ray and the optical axis at the focal point of the lens, $f$ is the focal length of the lens, and $h$ is the ray height of the collimated ray.

* * * * *